(12) United States Patent
Thetford

(10) Patent No.: US 7,872,070 B2
(45) Date of Patent: Jan. 18, 2011

(54) COMPOSITIONS

(75) Inventor: Dean Thetford, Rochdale (GB)

(73) Assignee: Lubrizol Limited, Hazelwood, Derby (GB)

( * ) Notice: Subject to any disclaimer, the term of this patent is extended or adjusted under 35 U.S.C. 154(b) by 476 days.

(21) Appl. No.: 11/719,657

(22) PCT Filed: Dec. 6, 2005

(86) PCT No.: PCT/US2005/043925

§ 371 (c)(1), (2), (4) Date: May 18, 2007

(87) PCT Pub. No.: WO2006/068813

PCT Pub. Date: Jun. 29, 2006

(65) Prior Publication Data

US 2009/0186981 A1    Jul. 23, 2009

Related U.S. Application Data

(60) Provisional application No. 60/638,091, filed on Dec. 21, 2004.

(51) Int. Cl.
*C08G 69/26* (2006.01)
*C08L 77/06* (2006.01)

(52) U.S. Cl. ...................... 524/608; 524/606

(58) Field of Classification Search ............. 524/210, 524/217, 612, 606, 608
See application file for complete search history.

(56) References Cited

U.S. PATENT DOCUMENTS

| 4,645,611 | A |  | 2/1987 | Campbell et al. |
| 4,865,621 | A |  | 9/1989 | Sung |
| 6,020,373 | A | * | 2/2000 | Schellenberg et al. ....... 514/547 |
| 6,197,877 | B1 |  | 3/2001 | Thetford et al. |
| 2003/0118545 | A1 | * | 6/2003 | Shi et al. ................ 424/78.37 |
| 2004/0058870 | A1 | * | 3/2004 | Froland et al. ................ 514/12 |
| 2005/0085404 | A1 | * | 4/2005 | Yoneda et al. .............. 510/421 |

FOREIGN PATENT DOCUMENTS

EP    0 905 207 A2    3/1999
WO    2005/010109 A2    2/2005

* cited by examiner

*Primary Examiner*—Milton I Cano
*Assistant Examiner*—John Uselding
(74) *Attorney, Agent, or Firm*—Samuel B. Laferty

(57) ABSTRACT

The present invention provides a composition containing a particulate solid, an organic medium and/or water and a compound of Formula (1) and salts thereof Formula 1 wherein R is H or $C_{1-30}$-optionally substituted hydrocarbyl; or R may be R"C═O (an acyl group where R" is hydrogen, alkyl, aryl or an optionally substituted alkyl or aryl); U is oxygen, —NH or —NR'"; R'" is a $C_{1-30}$-optionally substituted hydrocarbyl Y is $C_{2-4}$-alkyleneoxy; T is the residue of substituted acetic acid or propionic acid; Z is the residue of a polyamine and/or polyimine; W is the residue of an oxide, urea or dibasic acid or anhydride thereof, or mixtures thereof; x is from 2 to 90; and v represents the maximum available number of amino and/or imino groups in Z which does not carry the group R—U—(Y)x-T-.

13 Claims, No Drawings

COMPOSITIONS

CROSS REFERENCE TO RELATED APPLICATION

This application claims priority from PCT Application Serial No. PCT/US2005/043925 filed on Dec. 6, 2005, which claims benefit from Provisional Application Ser. No. 60/638,091 filed on Dec. 21, 2004.

FIELD OF INVENTION

The present invention relates to compositions comprising a particulate solid, an organic medium and a dispersant and to their use in inks, millbases, plastics, and paints.

BACKGROUND OF THE INVENTION

Many formulations such as inks, paints, mill-bases and plastics materials require effective dispersants for uniformly distributing a particulate solid in an organic medium. The organic medium may vary from a polar to non-polar organic medium. Consequently, dispersants are sought which can disperse a particulate solid in both a polar and a non-polar organic medium.

U.S. Pat. No. 4,224,212 discloses dispersants comprising a polyester derived from a hydroxycarboxylic acid with at least 8 carbon atoms reacted with a poly(loweralkylene)imine. The dispersants are effective in non-polar medium such as aliphatic solvents and plastics.

EP208041 discloses dispersants comprising a polyester derived from ε-caprolactone reacted with a poly(loweralkylene)imine. The dispersants are effective in more polar medium such as ketones and esters.

U.S. Pat. No. 4,865,621 discloses motor fuel compositions comprising the reaction product of a dibasic acid anhydride, a polyoxyalkylene monoamine and a hydrocarbyl polyamine having a number average molecular weight of up to 1343.

SUMMARY OF THE INVENTION

It has been found that certain dispersants show excellent ability to disperse a particulate solid in a range of organic media, particularly polar organic media and including water. Thus, according to the present invention, there is provided a composition comprising a particulate solid, an organic medium and/or water and a compound of Formula (1) and salts thereof:

R—U—(Y)$_x$-T-Z—W$_{0-v}$    Formula 1 wherein

R is H or C$_{1-30}$-optionally substituted hydrocarbyl; or R may be R"C=O (an acyl group where R" is hydrogen, alkyl, aryl or an optionally substituted alkyl or aryl);

U is oxygen, —NH or —NR'";

R'" is a C$_{1-30}$-optionally substituted hydrocarbyl

Y is C$_{2-4}$-alkyleneoxy;

T is the residue of substituted acetic acid or propionic acid;

Z is the residue of a polyamine and/or polyimine;

W is the residue of an oxide, urea or dibasic acid or anhydride thereof, or mixtures thereof;

x is from 2 to 90;

v represents the maximum available number of amino and/or imino groups in Z which does not carry the group R—U—(Y)x-T- (i.e., v is the number of unsubstituted valences of Z) and 0–v means 0÷v.

Since Z is the residue of a polyamine and/or polyimine, there is typically more than 2 groups R—U—(Y)$_x$-T- attached to Z and these may be the same or different.

DETAILED DESCRIPTION OF THE INVENTION

The present invention provides a composition as described above.

In one embodiment, R is a hydrocarbyl including aryl, aralkyl, alkaryl, cycloalkyl or alkyl, which may be linear or branched.

In one embodiment, R is alkyl optionally a branched alkyl containing C$_{1-30}$, C$_{1-20}$, C$_{1-6}$ or C$_{1-4}$-alkyl. In one embodiment, R is a methyl.

When R is substituted hydrocarbyl, the substituent may be C$_{1-10}$-alkoxy, carbonyl, sulphonyl, carbamoyl, sulphamoyl, halogen, nitrile, ureido, hydroxyl, urethane or ester (i.e., —COO— or —OCO—). In one embodiment, R is unsubstituted.

In one embodiment, R is aryl including naphthyl or phenyl. In one embodiment, R is aralkyl including 2-phenylethyl or benzyl.

In one embodiment, R is alkaryl including octyl phenyl or nonyl phenyl.

In one embodiment, R is cycloalkyl including C$_{3-8}$-cycloalkyl such as cyclopropyl or cyclohexyl.

When Y is C$_{3-4}$-alkyleneoxy and the chain represented by (Y)$_x$ contains ethyleneoxy (—CH$_2$CH$_2$O—), the structure of (Y)$_x$ may be random or block. The number of ethyleneoxy units is between 0 and 9 or 1 to 9 or 1 to 8. In one embodiment, the number of ethyleneoxy units is 0.

The chain represented by (Y)$_x$ may contain only one type of C$_{3-4}$-alkyleneoxy repeat unit or it may contain two or more different C$_{3-4}$-alkyleneoxy repeat units. When the chain represented by (Y)$_x$ contains two or more different C$_{3-4}$-alkyleneoxy repeat units, the structure of (Y)$_x$ may be random or block.

In one embodiment, Y is a C$_{3-4}$-alkyleneoxy group, —CH$_2$CH$_2$CH$_2$CH$_2$O— or —CH$_2$CH(CH$_3$)CH$_2$O— or —CH$_2$CH(CH$_3$)O—. In another embodiment, Y is a —CH$_2$CH$_2$CH(CH$_3$)O— or —CH$_2$—CH(CH$_2$—CH$_3$)—O—. In one embodiment, Y is C$_{3-4}$-alkyleneoxy and the chain represented by (Y)$_x$ is from —CH$_2$CH$_2$CH$_2$CH$_2$O—, —CH$_2$CH(CH$_3$)O— or —CH$_2$—CH(CH$_2$—CH$_3$)—O—.

In one embodiment, the compound of Formula (1) defines Y as —CH$_3$CH(CH$_3$)O— and the chain represented by (Y)$_x$ may contain up to 9 ethyleneoxy repeat units.

The group R—U—(Y)$_x$-T- in one embodiment is the residue of a polyalkyleneoxide.

When Z is the residue of a polyamine, it includes polyvinylamine or polyallylamine. Polyallylamine and poly(N-alkyl)allylamines of differing molecular weight are commercially available from Nitto Boseki. Polyvinylamine of differing molecular weight are available from Mitsubishi Kasei.

In one embodiment Z, is the residue of a polyimine and includes poly (C$_{2-6}$-alkyleneimine) and especially polyethyleneimine (PEI). The polyimine may be linear or especially branched. Linear polyethyleneimine may be prepared by the hydrolysis of poly(N-acyl) alkyleneimines as described, for example, by Takeo Saegusa et al. in Macromolecules, 1972, Vol 5, page 4470. Branched polyethyleneimines of differing molecular weight are commercially available from BASF and Nippon Shokubai. Polypropyleneimine dendrimers are commercially available from DSM Fine Chemicals and poly(amidoamine) dendrimers are available as "Starburst" dendrimers from Aldrich Chemical Company.

Other useful types of polyamine mixtures are those resulting from stripping of the above-described polyamine mixtures to leave as residue what is often termed "polyamine bottoms". In general, alkylenepolyamine bottoms may be characterised as having less than two, usually less than 1% (by weight) material boiling below about 200° C. A typical sample of such ethylene polyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentamine and 76.61% pentaethylenehexamine and higher (by weight). These alkylenepolyamine bottoms include cyclic condensation products such as piperazine and higher analogs of diethylenetriamine or triethylenetetramine.

The number average molecular weight of the polyamine or polyimine in one embodiment is from 300 to 650,000, 500 to 600,000, 600 to 100,000 or 1200 to 70,000. In the case of polyethyleneimine, the number-average molecular weight in one embodiment is not less than 1500, not less than 3,000 or not less than 5,000.

The residue of dibasic acid represented by W may be derived from any dibasic acid of formula HOOC—B'—COOH or anhydride thereof wherein B' is a direct bond or a divalent organic moiety containing from 1 to 20 carbon atoms. B' may be aromatic, hetero aromatic, alicyclic or aliphatic which may be optionally substituted. When B' is aliphatic containing two or more carbon atoms, it may be linear or branched, saturated or unsaturated. In one embodiment, B' is unsubstituted. In another embodiment, B' contains not greater than 12 carbon atoms and in another embodiment not greater than 8 carbon atoms.

When B' is aromatic, it includes phenylene, when B' is alicyclic, it includes cyclohexylene, and when B' is aliphatic, it includes an alkylene. In one embodiment, the dibasic acids are terephthalic, tetrahydrophthalic, methyl tetrahydrophthalic, hexahydrophthalic, methyl hexahydrophthalic, trimellitic, $C_{1-20}$-alkenyl or alkyl succinic acids. In one embodiment, the dibasic acids are derived from maleic, malonic, succinic or phthalic acid. When the dibasic acid is derived from an anhydride, suitable examples are derived from glutaric, succinic, maleic anhydride or phthalic anhydride.

Mixtures of dibasic acids or anhydrides thereof may be used. Thus, W may be the residue of one or more than one different dibasic acid or anhydride. In one embodiment, W is the residue of a single dibasic acid or anhydride. Similarly, W may be the residue of one or more than one different dibasic acid or anhydride. In one embodiment, W is the residue of a single dibasic acid or anhydride.

In one embodiment, the polyamine or polyimine represented by Z carries 2 or more groups R—U—(Y)x-T- groups which may be the same or different. Dispersants of this type may be conveniently represented by Formula (2):

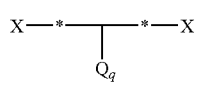

Formula (2)

wherein

X-*-*-X represents the polyamine and/or polyimine;

Q is the chain R—U—(Y)$_x$-T-; and q is from 2 to 2000.

In one embodiment, the polyamine or polyimine represented by Z carries two or more different polymer chains and is represented by formula 2a.

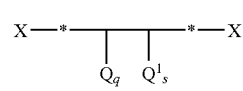

Formula 2a wherein

X-*-*-X and Q are as defined hereinbefore; and $Q^1$ represents a polyester and/or polyamide chain of formula $R^1$-G-(B)$_m$—;

$R^1$ is hydrogen or $C_{1-50}$-optionally substituted hydrocarbyl;

G is a divalent bond or carbonyl;

B is the residue of one or more amino carboxylic acids, one or more hydroxy carboxyl acids, one or more lactones of hydroxycarboxyl acids, or mixtures thereof;

q and s are positive integers greater than zero;

m is a positive integer from 2 to 2000; and q+s is from 2 to 2000.

In one embodiment, G is carbonyl and $R^1$-G- is the residue of a $C_{1-50}$-optionally substituted hydrocarbyl carboxylic acid and especially a $C_{1-50}$-optionally substituted aliphatic acid where the aliphatic group may be saturated or unsaturated, linear or branched.

In one embodiment, $R^1$ contains not greater than 30 carbon atoms as disclosed hereinbefore for R.

$R^1$—CO— may also be the residue of a linear or branched, saturated or unsaturated optionally substituted carboxylic acid such as methoxy-acetic acid, propionic acid, butyric acid, hexanoic acid, octanoic acid, lauric acid, dodecanoic acid, stearic acid, 2-ethyl butyric acid, 2-ethyl hexanoic acid, 2-butyl octanoic acid, 2-hexyl decanoic acid, 2-octyl decanoic acid and 2-decyl tetra decanoic acid. Branched alkyl carboxylic acids of this type are also available under the trade name Isocarb (ex Condea GmbH) and specific examples are Isocarb 12, 16, 20, 28, 32, 34T and 36.

When $R^1$ is substituted, the substituent may be one or more ether groups or two or more ether groups. Thus, $R^1$—CO— may be the residue of an Akypo™ carboxylic acid (ex Kao Chem GmbH). Specific examples are Akypo LF1, Akypo LF2, Akypo RLM 25, Akypo RLM 45 CA, Akypo RO 20 VG and Akypo RO 50 VG.

The amino carboxylic acid from which B is obtainable includes amino-$C_{2-20}$-alk(en)ylene carboxylic acid or an amino $C_{1-20}$-alkylene carboxylic acid. In one embodiment, the alk(en)ylene group contains not greater than 12 carbon atoms. Specific examples are 11-amino undecanoic acid, 6-amino caproic acid, 4-amino butyric acid, β-alanine or sarcosine.

The hydroxy carboxylic acid from which B is derivable includes a hydroxy-$C_{2-20}$-alkenylene carboxylic acid or a hydroxy-$C_{1-20}$ alkylene carboxylic acid. Specific examples of suitable hydroxy carboxylic acids are ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, lactic acid or glycolic acid.

B is also derivable from a lactone such as β-propiolactone, optionally $C_{1-6}$-alkyl substituted ε-caprolactone and optionally $C_{1-6}$-alkyl substituted δ-valerolactone. Specific examples are ε-caprolactone and the 7-methyl-, 3-methyl-, 5-methyl-, 6-methyl-, 4-methyl-, 5-tetra-butyl-, 4,4,6-trimethyl- and 4,6,6-trimethyl-ε-caprolactone and δ-valerolactone.

In one embodiment, the ratio of q to s is from 6:1 to 1:6.

As noted hereinbefore, the dispersant may be present in the form of a salt. Where the dispersant contains a carboxylic acid group, the salt may be that of an alkali metal such as lithium, potassium or sodium. Alternatively, the salt may be formed with ammonia, an amine or quaternary ammonium cation. Examples of amines are methylamine, diethylamine, ethanolamine, diethanolamine, hexylamine, 2-ethylhexylamine and octadecylamine. The quaternary ammonium cation may be a quaternary ammonium cation or a benzalkonium cation. The quaternary ammonium cation in one embodiment contains one or two alkyl groups containing from 6 to 20 carbon atoms. Examples of quaternary ammonium cations are tetraethyl ammonium, N-octadecyl-N,N,N-trimethyl ammonium; N,N-didodecyl-N,N-dimethyl ammonium, N-benzyl-N,N,N-trimethyl ammonium and N-benzyl-N-octadecyl-N,N-dimethyl ammonium cation.

In one embodiment, the dispersant containing a carboxylic acid group is in the form of a free acid.

The dispersant of formula 1 where v is zero may be in the form of a salt of a coloured acid. The coloured acid may be any anionic dyestuff such as sulphonated or carboxylated copper or nickel phthalocyanine containing on average 0.5 to 3 sulphonic acid groups per molecule or a disazo dyestuff containing a sulphonic acid and/or carboxylic acid group.

When v is zero, some of the amine/imine groups in Z which do not carry the group R—U—(Y)x-T- may be converted into substituted ammonium groups by reaction with an acid or quaternising agent. Suitable reagents for this purpose include mineral and strong acids such as hydrochloric acid, acetic acid, sulphuric acid, alkyl sulphonic acids, alkyl hydrogen sulphates or aryl sulphonic acids. Quaternising agents include dimethyl sulphate, benzyl chloride, methyl halides such as chlorine, bromine and iodine, and propane (or butane) sulfone.

The compound of Formula (1) may be made by any method known to the art. A precursor to Formula (1) before reaction with polyamine and/or polyimine may be prepared by the processes described in U.S. Pat. No. 4,713,487 and EP 73545.

When T, the residue of a propionic acid, the compound of Formula (1) may be produced with (meth)acrylonitrile at a reaction temperature 20° C. to 70° C., or 30° C. to 50° C. Typically, the reaction takes place in a toluene solvent. A more detailed description is given in Japanese Laid-open Publication No. 2004-89787 after Formula (2).

The reaction with the polyamine and/or polyimine is carried out in one embodiment at a temperature of from 100° C. to 200° C. Under such conditions, the reaction results in a mixture of amide and salt forms rather than the salt form alone.

The reaction involving the dibasic acid or anhydride thereof is typically carried out in the presence of an organic diluent which is inert to the reactants. In one embodiment, the organic diluent is a solvent for the reactants. The organic diluent may be aromatic or aliphatic including halogenated derivatives. Examples are toluene, chlorobenzene, heptane and petroleum ether distillates. Typically, the reaction is carried out in the absence of an organic diluent.

When W is the residue of an oxide, the number of amino and/or imine groups in Z which do not carry the group R—U—(Y)$_x$-T- may vary over wide limits. Such dispersants are easily prepared by reacting dispersants containing free amino and/or imino groups with an oxidising compound such as oxygen (or air) or a peroxide such as hydrogen peroxide or ammonium persulphate. Similarly, when W is the residue of urea such dispersants may also be readily prepared by reacting any free amino and/or imino groups in Z which do not carry the group R—U—(Y)$_x$-T- with urea. In one embodiment, the reaction is carried out in an inert atmosphere at a temperature between 80° C. and 140° C.

In the specific case where W is the residue of a dibasic acid or anhydride thereof, the majority of amino and/or imino groups in Z which do not carry the group R—U—(Y)$_x$-T- are reacted with the dibasic acid or anhydride.

The particulate solid present in the composition may be any inorganic or organic solid material which is substantially insoluble in the organic medium. In one embodiment, the particulate solid is a pigment.

Examples of suitable solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids; particulate ceramic materials; magnetic materials and magnetic recording media; fibers such as glass, steel, carbon and boron for composite materials, and biocides, agrochemicals and pharmaceuticals which are applied as dispersions in organic media.

In one embodiment, the solid is an organic pigment from any of the recognized classes of pigments described, for example, in the Third Edition of the Colour Index (1971) and subsequent revisions of, and supplements thereto, under the chapter headed "Pigments". Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment the organic pigments are phthalocyanines, especially copper phthalocyanines, monoazos, disazos, indanthrones, anthranthrones, quinacridones and carbon blacks.

Inorganic solids include: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

Other useful solid materials include agrochemicals such as the fungicides flutriafen, carbendazim, chlorothalonil and mancozeb.

The organic medium present in the composition of the invention in one embodiment is a plastics material and in another embodiment an organic liquid. The organic liquid may be a non-polar or a polar organic liquid, although a polar organic liquid is typically used. By the term "polar" in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40, and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. In one embodiment, solvents are alkanols, alkane carboxylic acids and esters of alkane carboxylic acids. In one embodiment, the present invention is suitable for organic liquids that are substantially non-soluble in an aqueous medium. Furthermore, a person skilled in the art will appreciate that small quantities of an aqueous medium (such as glycols, glycol ethers, glycol esters and alcohols) may be present in the organic liquids provided the overall organic liquid is substantially non-soluble in an aqueous medium.

Examples of organic liquids, which may be used as polar organic liquids are film-forming resins such as, are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the organic liquid comprises at least 0.1% by weight, or 1% by weight or more of a polar organic liquid based on the total organic liquid.

The organic liquid optionally further comprises water. In one embodiment, the organic liquid is free of water.

When the organic liquid contains water, the amount present in one embodiment is not greater than 70%, not greater than 50%, or not greater than 40% by weight based on the amount of organic liquid.

The plastics material may be a thermoset resin or a thermoplastic resin. The thermosetting resins useful in this invention include resins which undergo a chemical reaction when heated, catalysed, or subject to UV radiation and become relatively infusible. Typical reactions in thermosetting resins include oxidation or unsaturated double bonds, reactions involving epoxy/amine, epoxy/carbonyl, epoxy/hydroxyl, polyisocyanate/hydroxy, amino resin/hydroxy moieties, free radical reactions or polyacrylate, cationic polymerization or epoxy resins and vinyl ether, condensation or silanol, etc.

Polymers with hydroxy functionality (frequently polyols) are widely used in thermosetting system to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and biphenylmethane diisocyanates.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods.

If desired, the compositions may contain other ingredients, for example, resins (where these do not already constitute the organic medium), binders, fluidizing agents anti-sedimentation agents, plasticizers, surfactants, anti-foamers, rheology modifiers, leveling agents, gloss modifiers and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the composition.

The composition of the present invention is particularly suited to liquid dispersions. In one embodiment, such dispersion compositions comprise:

(a) from 0.5 to 30 parts of a particulate solid;
(b) from 0.5 to 30 parts of a compound of Formula (1); and
(c) from 40 to 99 parts of an organic liquid; wherein all parts are by weight and the amounts (a)+(b)+(c)=100.

In one embodiment, component a) comprises from 0.5 to 30 parts of a pigment and such dispersions are useful as liquid inks, paints and mill-bases.

If a composition is required comprising a particulate solid and a dispersant of Formula (1) in dry form, the organic liquid is typically volatile so that it may be readily removed from the particulate solid by a simple separation means such as evaporation. In one embodiment, the composition comprises the organic liquid.

If the dry composition consists essentially of the dispersant of Formula (1) and the particulate solid, it typically contains at least 0.2%, at least 0.5% or at least 1.0% dispersant of Formula (1) based on weight of the particulate solid. In one embodiment, the dry composition contains not greater than 100%, not greater than 50%, not greater than 20% or not greater than 10% by weight of dispersant of Formula (1) based on the weight of the particulate solid.

As disclosed hereinbefore, the compositions of the invention are suitable for preparing mill-bases wherein the particulate solid is milled in an organic liquid in the presence of a compound for Formula (1) and salts thereof.

Thus, according to a still further aspect of the invention there is provided a mill-base comprising a particulate solid, an organic liquid and a compound of Formula (1) and salts thereof.

Typically, the mill-base contains from 20 to 70% by weight particulate solid based on the total weight of the mill-base. In one embodiment, the particulate solid is not less than 10 or not less than 20% by weight of the mill-base. Such mill-bases may optionally contain a binder added either before or after milling.

The binder is a polymeric material capable of binding the composition on volatilization of the organic liquid.

Binders are polymeric materials including natural and synthetic materials. In one embodiment, binders include poly (meth)acrylates, polystyrenics, polyesters, polyurethanes, alkyds, polysaccharides such as cellulose, and natural proteins such as casein. In one embodiment, the binder is present in the composition at more than 100% based on the amount of particulate solid, more than 200%, more than 300% or more than 400%.

The amount of optional binder in the mill-base can vary over wide limits but is typically not less than 10%, and often not less than 20% by weight of the continuous/liquid phase of the mill-base. In one embodiment, the amount of binder is not greater than 50% or not greater than 40% by weight of the continuous/liquid phase of the mill-base.

The amount of dispersant in the mill-base is dependent on the amount of particulate solid but is typically from 0.5 to 5% by weight of the mill-base.

Dispersions and mill-bases made from the composition of the invention are particularly suitable for use in coatings and paints especially high solids paints; inks, especially flexographic, gravure and screen inks; non-aqueous ceramic processes, especially tape-coating, doctor-blade, extrusion and injection molding type processes; composites, cosmetics, adhesives and plastics materials.

Thus, according to a further aspect of the present invention, there is provided a paint or ink comprising a particulate solid, an organic liquid, a binder and a compound of Formula (1) and salts thereof.

As noted hereinbefore, many of the dispersants of Formula (1) are novel.

According to a still further aspect of the invention, there is provided a compound of Formula (1) and salts thereof wherein Z is a polyamine and/or polyimine having a number average molecular weight of not less than 1500 and where v is zero.

In one embodiment, the compound of Formula (1) and salts thereof is provided wherein Y is $C_{3-4}$-alkyleneoxy, the chain represented by $(Y)_x$ may contain up to 9 by number of ethyleneoxy repeat units and Z is a polyamine and/or polyimine having a number average molecular weight of not less than 1200.

The invention is further illustrated by the following examples wherein all references to amounts are in parts by weight unless indicated to the contrary.

EXAMPLES

Example 1

Intermediate 1

The polyalkoxylate (MeO+20 PO+9 EO) (50 g 30.6 mmols), potassium hydroxide (KOH) (15.48 g 270 mmols) and toluene (140 ml) are stirred at 120° C. under a nitrogen atmosphere for 30 minutes. Sodium chloroacetate (8.94 g 76 mmols) is then added carefully and the reaction continued at 120° C. for 18 hours and then allowed to cool below 100° C. Water (20 g) is added and the reaction mixture stirred for another 30 minutes at 85° C. The pH of the solution is then adjusted to pH 2 using concentrated hydrochloric acid (HCl). Thereafter, 23% aqueous sodium chloride (NaCl) solution (50 ml) is added and the mixture heated to 90° C. with stirring for 1 hour. The aqueous layer is then separated. The toluene extract is washed with more 23% aqueous sodium chloride (NaCl) (50 ml), and dried with magnesium sulphate ($MgSO_4$), filtered and then the solvent is removed under reduced pressure to give an amber liquid (44 g). IR shows the presence of a carboxylic acid carbonyl group $v_{max}$ 1738 cm$^{-1}$. Acid value=32.4 mg KOH/g. This is intermediate 1.

Intermediate 2

Sodium hydride (2.3 g 66% in oil) is washed with diethyl ether (75 ml and 2×25 ml) and then the polyalkoxylate (Methoxypolypropylene glycol MW1900) (100 g 52.6 mmols) is added and the mixture is stirred at 100° C. under a nitrogen atmosphere for 2 hours. Sodium chloroacetate (7 g 60 mmols) is added carefully and the reaction continued at 120° C. for 5 hours before cooling to below 100° C. The mixture is added to water (700 ml) and the reaction mixture stirred for 45 minutes at 50° C. to give an emulsion. The pH of the emulsion is adjusted to pH2 using 2M HCl (75 ml). After stirring at 50° C. for 45 minutes, the emulsion separates into an oil phase and aqueous phase. The oil phase is extracted using toluene (750 ml). The toluene extract is washed with more water (2×200 ml), dried with Mg SO4 and filtered. Thereafter, the solvent is removed under reduced pressure to give an amber liquid (76 g). IR shows the presence of a carboxylic acid carbonyl group $v_{max}$ 1738 cm$^{-1}$. The Acid value is 27.6 mg KOH/g. This is intermediate 2.

Intermediate 3

The process for making Intermediate 3 is the same as Intermediate 2, except the reagents are sodium hydride (3.43 g 66% in oil), diethyl ether (75 ml and 2×25 ml), polyalkoxylate (Methoxypolypropylene glycol MW1300) (100 g 76.9 mmols) and sodium chloroacetate (10.15 g 87 mmols). The product is an amber liquid (100 g). IR shows the presence of a carboxylic acid carbonyl group $\nu_{max}$ 1738 cm$^{-1}$. The Acid value is 33.4 mg KOH/g.

Intermediate 4

Polyalkoxylate (2-Naphthol+10PO+9EO) (50 g 30.6 mmols), KOH (15.48 g 270 mmols) and toluene (140 ml) are stirred at 120° C. under a nitrogen atmosphere for 30 minutes. Sodium chloroacetate (8.94 g 76 mmols) is added carefully and the reaction continued at 120° C. for 18 hours and then allowed to cool below 100° C. Water (20 g) is then added and the reaction mixture stirred for 30 minutes at 85° C. to form a solution. The pH of the solution is adjusted to pH2 using concentrated HCl. Thereafter, 23% NaCl aq solution (50 ml) is added and the mixture heated to 90° C. with stirring for 1 hour. The aqueous layer is separated. Toluene extract is washed with more 23% NaCl aqueous solution (50 ml), dried with Mg SO4, filtered and then the solvent is removed under reduced pressure to give an amber liquid (44 g). The IR spectrum shows the presence of a carboxylic acid carbonyl group $\nu_{max}$ 1738 cm$^{-1}$. The acid value=56.1 mg KOH/g. This is intermediate 4.

Intermediate 5

The process for making Intermediate 3 is the same as Intermediate 2, except the reagents are sodium hydride (12.9 g 66% in oil), diethyl ether (75 ml and 2×25 ml), the polyalkoxylate (Methoxypolypropylene glycol MW700) (200 g 286 mmols) and sodium chloroacetate (38.17 g 328 mmols). The product is an amber liquid (100 g). IR shows the presence of a carboxylic acid carbonyl group $\nu_{max}$ 1738 cm$^{-1}$. The Acid value is 67.3 mg KOH/g.

Dispersant 1: Polyethyleneimine Derivatives of Intermediate 1 with Ratio of Intermediate 1:PEI SP200 of 13:1

Intermediate 1 (26 g) is stirred with 2 g of PEI SP200 (Polyethyleneimine, ex Nippon Shokubai MW 10000) at 120° C. for 6 hours under a nitrogen atmosphere to give upon cooling an amber viscous liquid (26 g). Acid value=22.2 mg KOH/g. This is Dispersant 1.

Dispersant 2: Polyethyleneimine Derivatives of Intermediate 1 with Ratio of Intermediate 1:PEI SP200 of 7:1

Intermediate 1 (17 g) is stirred with PEI SP200 (2.42 g) at 120° C. for 6 hours under a nitrogen atmosphere to give upon cooling an amber viscous liquid (18 g). Acid value=23.3 mg KOH/g. This is Dispersant 2.

Dispersant 3

Dispersant 3 is prepared by stirring 17.5 g of Intermediate 2 with PEI SP012 (2.5 g) at 140° C. for 4 hours under a nitrogen atmosphere to give upon cooling a cream solid (19 g). The Acid value is 4.1 mg KOH/g.

Dispersant 4

Dispersant 4 is prepared by stirring 14 g of Intermediate 2 with PEI SP012 (7 g) at 120° C. for 6 hours under a nitrogen atmosphere to give upon cooling an amber viscous liquid (20 g). The Acid value is 9.5 mg KOH/g.

Dispersant 5

Dispersant 5 is prepared by stirring 17.5 g of Intermediate 3 with PEI S012 (2.5 g) at 120° C. for 6 hours under a nitrogen atmosphere to give upon cooling a brown liquid (26 g). The Acid value is 13.6 mg KOH/g.

Dispersant 6

Dispersant 6 is prepared by stirring 26 g of Intermediate 4 with polyallylamine MW17000 (10 g 20% aqueous solution) at 120° C. for 6 hours under a nitrogen atmosphere to give upon cooling an amber solid (26 g). The Acid value is 50.7 mg KOH/g.

Dispersant 7

Dispersant 7 is prepared by stirring 20 g of Intermediate 4 with PEI SP075 (1.33 g) at 120° C. for 6 hours under a nitrogen atmosphere to give upon cooling an amber viscous liquid (20 g). The Acid value is 39.3 mg KOH/g.

Dispersant 8

Dispersant 8 is prepared by stirring 16 g of Dispersant 7 in the presence of 20 ml of toluene and succinic anhydride (0.26 g) for 2 hours at 70° C. The solvent is allowed to evaporate from the mixture when the IR spectrum confirms negligible/no anhydride functionality is present by heating to 120° C. The Acid value of the product is 51 mgKOH/g.

Dispersant 9

Dispersant 9 is prepared by stirring 15 g of Intermediate 5 with PEI SP012 (5 g) at 120° C. for 6 hours under a nitrogen atmosphere to give upon cooling an amber viscous liquid (18 g). The product has an Acid value of 18.9 mg KOH/g.

Dispersant 10

Dispersant 10 is prepared by stirring 17.5 g of Intermediate 5 with PEI SP012 (2.5 g) at 120° C. for 6 hours under a nitrogen atmosphere to give upon cooling an amber viscous liquid (18 g). The Acid value is 13.9 mg KOH/g.

Comparative Example 1 is poly($\epsilon$-caprolactone) end-capped with lauric acid and reacted with polyethyleneimine as described in U.S. Pat. No. 4,645,611.

Comparative Example 2 is mill base prepared in the absence of dispersant.

Preparation of Mill-Bases

A series of magenta mill-bases are prepared utilizing Dispersants 1 to 2 and Comparative Examples 1 and 2. The mill-bases are prepared by dissolving dispersant 1 or 2 (0.45 g) in a solvent mixture of 7.55 g MPA:Butanol ratio of 4:1 (MPA=methoxypropylacetate). Glass beads (3 mm, 17 parts) and Monolite Rubine 3B (ex Heubach 2.0 parts) were added and the mixture was shaken on a horizontal shaker for 16 hours. The resulting dispersions were then assessed for fluidity using an arbitrary scale of A to E (good to bad). The milling grade obtained for the dispersants and comparative examples are shown in the Table.

| Examples | MPA:Butanol | Toluene |
| --- | --- | --- |
| 1 | C | C |
| 2 | C | C |
| 3 | C/D | C |
| 4 | D | C |
| 5 | C/D | |
| 6 | B/C | C |
| 7 | C/D | C/D |
| 8 | C/D | C/D |
| 9 | D | D |
| 10 | D | D |

-continued

| Examples | MPA:Butanol | Toluene |
|---|---|---|
| Comparative 1 | C/D | C |
| Comparative 2 | E | E |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, an organic medium and/or water and a compound of Formula (1) and salts thereof:

R—U—(Y)$_x$-T-Z—W$_{0-v}$     Formula 1 wherein Z carries two or more R–U–(Y)$_x$-T- groups;
R is H or C$_{1-30}$-optionally substituted hydrocarbyl; or R may be R"C=O (an acyl group where R" is hydrogen, alkyl, aryl or an optionally substituted alkyl or aryl);
U is oxygen, —NH or —NR'";
R'" is a C$_{1-30}$-optionally substituted hydrocarbyl
Y is C$_{2-4}$-alkyleneoxy;
T is the residue of substituted acetic acid or propionic acid;
Z is the residue of a polyamine and/or polyimine;
W is the residue of an oxide, urea or dibasic acid or anhydride thereof, or mixtures thereof;
x is from 2 to 90; and
v represents the maximum available number of amino and/or imino groups in Z which does not carry the group R—U—(Y)$_x$-T.

2. The composition as claimed in claim 1 wherein Y is C$_{3-4}$-alkyleneoxy and the chain represented by (Y)$_x$ contains up to 9 by number of ethyleneoxy repeat units and the number average molecular weight of the polyamine or polyimine is from 1200 to 70,000.

3. The composition of claim 2, wherein the number of ethyleneoxy units is 0.

4. The composition as claimed in claim 1 wherein Y is C$_{3-4}$-alkyleneoxy and the chain represented by (Y)$_x$ is —CH$_2$CH$_2$CH$_2$CH$_2$O—, —CH$_2$CH(CH$_3$)O— or —CH$_2$—CH(CH$_2$—CH$_3$)—O—.

5. The composition as claimed in claim 1 wherein W is the residue independently derived from the group consisting of maleic acid, malonic acid, succinic and phthalic acid, maleic anhydride, glutaric anhydride, succinic anhydride and phthalic anhydride.

6. The composition as claimed in claim 1 wherein the group represented by Z is polyethyleneimine.

7. The composition as claimed in claim 1 wherein the organic medium is an organic liquid or a plastics material.

8. The composition as claimed in claim 1 wherein the organic liquid comprises at least 0.1% by weight of a polar organic liquid based on the total organic liquid.

9. The composition as claimed in claim 1 wherein the particulate solid is a pigment.

10. The composition as claimed in claim 1, wherein the compound is represented by Formula (2)

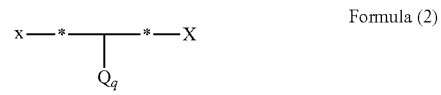

Formula (2)

wherein
X-*-*-X represents the polyamine and/or polyimine;
Q is the chain R—U—(Y)$_x$-T-; and
q is from 2 to 2000.

11. The composition as claimed in claim 1, wherein the compound is represented by Formula (2a)

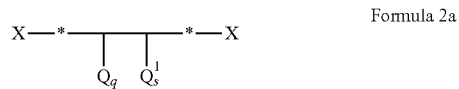

Formula 2a wherein
X-*-*-X represents the polyamine and/or polyimine;
Q is the chain R—U—(Y)$_x$-T-;
Q$^1$ represents a polyester and/or polyamide chain of formula R$^1$-G-(B)$_m$—;
R$^1$ is hydrogen or C$_{1-50}$-optionally substituted hydrocarbyl;
G is a divalent bond or carbonyl;
B is the residue of one or more amino carboxylic acids, one or more hydroxy carboxyl acids, one or more lactones of hydroxycarboxyl acids, or mixtures thereof;
s is a positive integer greater than zero;
m is a positive integer from 2 to 2000;
q+s is less than 2000; and
q is from 2 to 2000.

12. The composition of claim 10, wherein X-*-*-X represents polyethyleneimine.

13. The composition of claim 11, wherein X-*-*-X represents polyethyleneimine.

* * * * *